(12) United States Patent
Thor et al.

(10) Patent No.: US 8,173,950 B2
(45) Date of Patent: May 8, 2012

(54) SINGLE TRACK OPTICAL ENCODER

(75) Inventors: Chung Min Thor, Perak Darul Ridzuan (MY); Saidan Saiful Bahari, Penang (MY); Tengku Norazman Bin Tengku Abd Aziz, Selangor D.E. (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 448 days.

(21) Appl. No.: 12/343,469

(22) Filed: Dec. 23, 2008

(65) Prior Publication Data

US 2009/0206244 A1 Aug. 20, 2009

(51) Int. Cl.
*G01D 5/34* (2006.01)
(52) U.S. Cl. ................................... 250/231.1
(58) Field of Classification Search ............. 250/231.1, 250/231.13–231.18; 365/614, 616, 617; 341/11, 13, 14; 33/700, 706, 707; 702/158, 702/159
See application file for complete search history.

(56) References Cited

U.S. PATENT DOCUMENTS

| | | | |
|---|---|---|---|
| 4,451,731 A | 5/1984 | Leonard | |
| 4,691,101 A * | 9/1987 | Leonard | 250/231.16 |
| 5,317,149 A | 5/1994 | Uebbing et al. | |
| 5,825,307 A | 10/1998 | Titus et al. | |
| 5,998,784 A | 12/1999 | Venugopal et al. | |
| 6,140,636 A | 10/2000 | Norton et al. | |
| 7,126,108 B2 * | 10/2006 | Hin et al. | 250/231.13 |
| 7,182,258 B2 * | 2/2007 | Foo et al. | 235/454 |
| 7,385,178 B2 | 6/2008 | Chin et al. | |
| 7,394,061 B2 | 7/2008 | Saidan et al. | |
| 7,399,956 B2 | 7/2008 | Wong et al. | |
| 7,400,269 B2 | 7/2008 | Wong et al. | |
| 7,449,677 B2 | 11/2008 | Ng et al. | |
| 2003/0193016 A1 | 10/2003 | Chin et al. | |
| 2006/0097051 A1 | 5/2006 | Foo et al. | |
| 2006/0237540 A1 | 10/2006 | Saxena et al. | |
| 2007/0241943 A1 | 10/2007 | Tan et al. | |
| 2007/0246645 A1 | 10/2007 | Wong et al. | |
| 2008/0024797 A1 | 1/2008 | Otsuka et al. | |
| 2008/0111061 A1 * | 5/2008 | Wong et al. | 250/231.13 |
| 2008/0111062 A1 * | 5/2008 | Wong et al. | 250/231.13 |

FOREIGN PATENT DOCUMENTS

WO  WO 2007/142403  12/2007

OTHER PUBLICATIONS

Agilent Technologies, "Agilent AEDS-962x for 300 LPI Ultra Small Optical Encoder Modules data sheet", Nov. 2002.*

* cited by examiner

*Primary Examiner* — Georgia Y Epps
*Assistant Examiner* — Renee Naphas

(57) ABSTRACT

Disclosed are various embodiments of a reflective optical encoder having at least three channels—two data channels and one index channel—disposed along a common axis or single track. The single track configuration disclosed herein permits very high resolution reflective optical encoders in small packages to be provided. In addition, the single track configuration reduces problems with misalignment between code scales and light detectors, permits relatively simple electronic circuitry to be used to process outputs, and reduces manufacturing, assembly, integrated circuit and encoder costs. Methods of making and using such optical encoders are also disclosed.

24 Claims, 8 Drawing Sheets

SINGLE TRACK OPTICAL ENCODER

CROSS-REFERENCE TO RELATED APPLICATION

This patent application is submitted on the same date as U.S. patent application Ser. No. 12/343,468 entitled "Optical Encoder Systems, Devices and Methods" to Yee Loong Chin et al., the entirety of which is hereby incorporated by reference herein.

FIELD OF THE INVENTION

Various embodiments of the inventions described herein relate to the field of optical encoders, and components, devices, systems and methods associated therewith.

BACKGROUND

Optical encoders are typically employed as motion detectors in applications such as closed-loop feedback control in motor control systems. By way of example, many optical encoders are configured to translate rotary motion or linear motion into a two-channel digital output for position encoding.

Many optical encoders employ an LED as a light source. In transmissive encoders, the light is collimated into a parallel beam by means of a lens located over the LED. Opposite the emitter is a light detector that typically consists of photodiode arrays and a signal processor. When a code scale such as a code wheel or code strip moves between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

In some three channel optical encoders, an index channel light detector is provided comprising photodiode arrays I and I/, where the index channel light detectors are not aligned with the axis of the data channels and are offset laterally therefrom. Such encoders require increased surface area and package size to implement, however, and also suffer from an increased probability of misalignment between the code scale and the light detectors, seeing as light detectors are required over an increased surface area. Manufacturing costs and times are also typically increased in such an approach because specialized optical alignment equipment and steps are required. See, for example, U.S. Pat. No. 4,451,731 to Leonard.

A two-channel optical reflective encoder is disclosed in U.S. Pat. No. 7,394,061 to Bin Saidan et al. (hereafter "the '061 patent"). In the '061 patent, a third index channel output signal is provided through the relatively complicated processing of signals corresponding to the A, A/, B and B/ data channels. In such an encoder, considerable resources and time must be devoted to designing the complex output circuitry required to produce the index channel output signal. In addition, the outputs provided by the data and index channels may be degraded if the total currents generated by light detectors are insufficient to produce the required output signals. As a result, at least certain pairs of A, A/, B and B/ channels cannot be employed to produce the index channel output signal. At higher resolutions, the two-channel design of the '061 patent fails, as the widths and corresponding surface areas of the data channel light detectors are small and the current they generate is insufficient to generate an index output pulse. Additional electronic circuitry is therefore required to increase photodiode current.

The market demands ever smaller and higher resolution optical reflective encoders. What is needed is a smaller, higher resolution optical reflective encoder that can be provided without the use of complicated, expensive, signal processing output circuitry.

Various patents containing subject matter relating directly or indirectly to the field of the present invention include, but are not limited to, the following:
   U.S. Pat. No. 4,451,731 to Leonard, May 29, 1984;
   U.S. Pat. No. 7,182,248 to Foo et al., Jun. 10, 2008;
   U.S. Pat. No. 7,385,178 to Ng et al., Nov. 11, 2008.
   U.S. Pat. No. 7,400,269 to Wong et al., Jul. 15, 2008;
   U.S. Pat. No. 7,394,061 to Saidan et al., Jul. 1, 2008;
   U.S. Patent Publication No. 2006/0237540 to Saxena et al., Oct. 26, 2006, and
   U.S. Patent No. 2008/0024797 to Otsuka et al., Jan. 21, 2008.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Description and Claims set forth below, those skilled in the art will appreciate that at least some of the systems, devices, components and methods disclosed in the printed publications listed herein may be modified advantageously in accordance with the teachings of the various embodiments of the present invention.

SUMMARY

In some embodiments, there is provided a reflective optical encoder comprising a substrate having a top surface, a light emitter mounted on or attached to the top surface and configured to emit light therefrom, a single track light detector mounted on or attached to the top surface, the single track light detector having a common axis, the single track light detector having disposed along the common axis a plurality of alternating sequences of pairs of A and B data channel light detectors and A/ and B/ data channel light detectors, and at least one pair of index channel I and I/ light detectors, wherein the A and A/, and B and B/ light detectors are arranged 90 degrees out of phase with one another, and a code scale comprising index and data strips and configured to travel along the common axis, the code scale being located and configured operably in respect of the single track light detector such that at least a portion of the light emitted from the light emitter is reflected from the code scale towards the data and index channel light detectors.

In other embodiments, there is provided a method of making a reflective optical encoder comprising providing a substrate having a top surface, mounting on or attaching a light emitter to the top surface, mounting on or attaching a single track light detector to the top surface, the single track light detector having a common axis associated therewith, the single track light detector having disposed along the common axis a plurality of alternating sequences of pairs of A and B data channel light detectors and A/ and B/ data channel light detectors, and at least one pair of index channel I and I/ light detectors, wherein the A and A/, and B and B/ light detectors are arranged 90 degrees out of phase with one another, and locating and operably disposing a code scale in respect of the single track light detector, the code scale comprising index and data strips, such that the code scale travels along the common axis and at least a portion of the light emitted from the light emitter is reflected from the code scale towards the data and index channel light detectors.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In various embodiments of the invention, single track reflective optical encoder systems, devices and methods, are provided.

As employed herein, the term "single track encoder" means an optical encoder having a single code scale having data or code patterns or bars formed or presented thereon or therein, as well as index patterns or bars formed or presented thereon or therein, where the data and index patterns travel together along a common single axis in a single track disposed over a corresponding single track comprising data channel and index channel light detectors.

Figure 1:
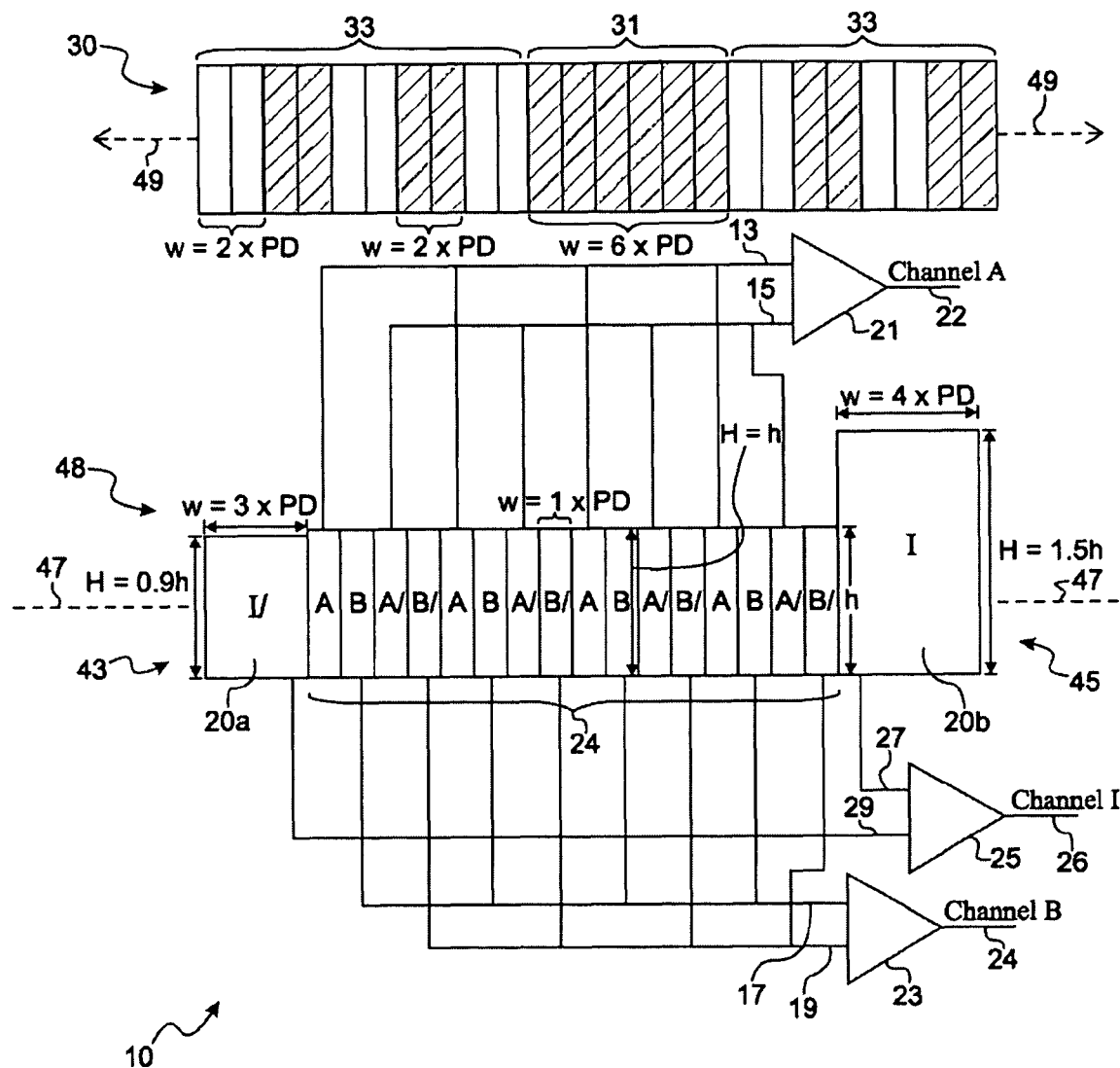
FIG. 1 shows a first embodiment of a reflective optical encoder 10 of the invention.

FIG. 1 shows one embodiment of reflective optical encoder 10, where single track light detector 48 is mounted on or otherwise attached to a top surface of a substrate (not shown in FIG. 1). A light emitter (also not shown) is also mounted on or attached to the top surface and configured to emit light therefrom. Single track light detector 48 has a common axis 47. Disposed along the common axis 47 are a plurality of alternating sequences of pairs of A and B data channel light detectors and A/ and B/ data channel light detectors 24, and at least one pair of index channel I and I/ light detectors 20a and 20b, which according to the embodiment of FIG. 1 are disposed at opposite ends 43 and 45 of single channel light detector 48. The respective pairs of A and A/, and B and B/ data channel light detectors 24 are arranged 90 degrees out of phase with one another. A code scale 30 comprises index and data strips 31 and 33, which, depending on the particular application at hand, are configured to travel along axis 49 in forward and/or backward directions. Axis 49 of code scale 30 is at least roughly coincident and parallel with corresponding axis 45 of single track light detector 47. Code scale 30 is located and configured operably in respect of single track light detector 48 such that at least a portion of the light emitted from the light emitter is reflected from code scale 30 back towards data and index channel light detectors 24, 20a and 20b.

Figure 2:
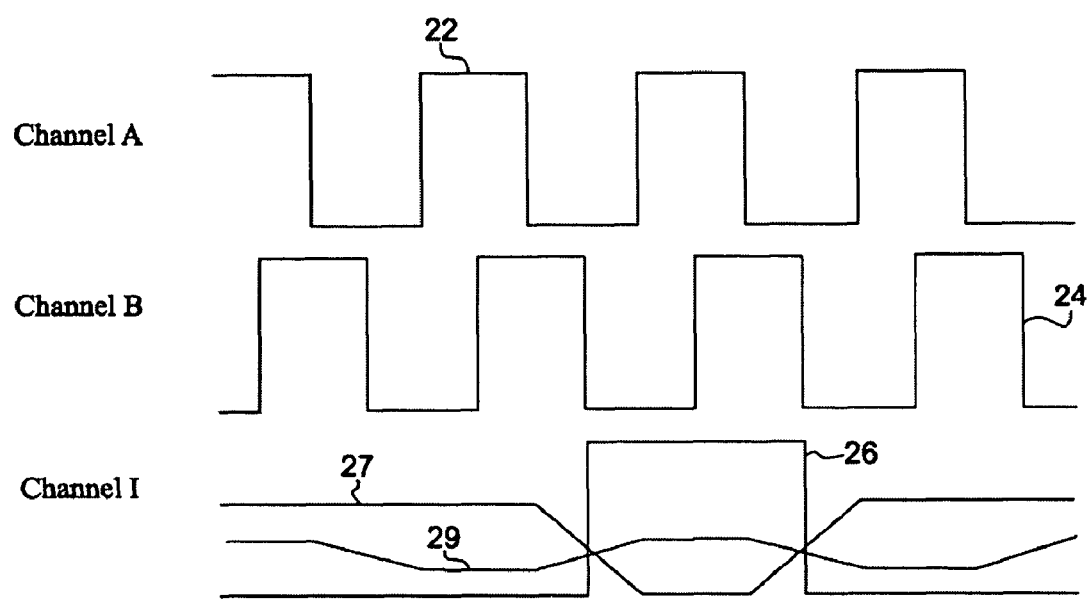
FIG. 2 shows illustrative output signals provided by the embodiment of FIG. 1.
Figure 3:
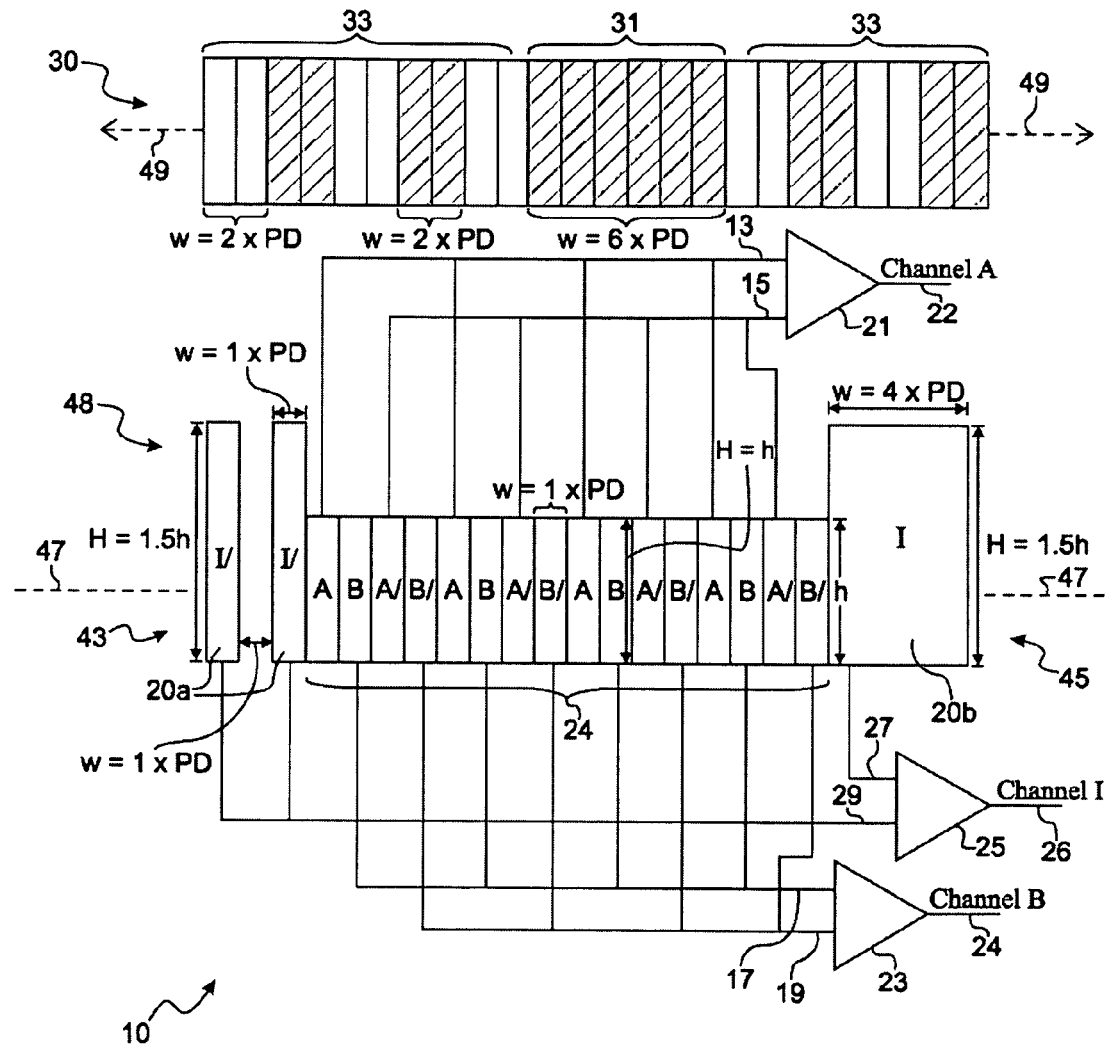
FIG. 3 shows a second embodiment of a reflective optical encoder 10 of the invention.
Figure 5:
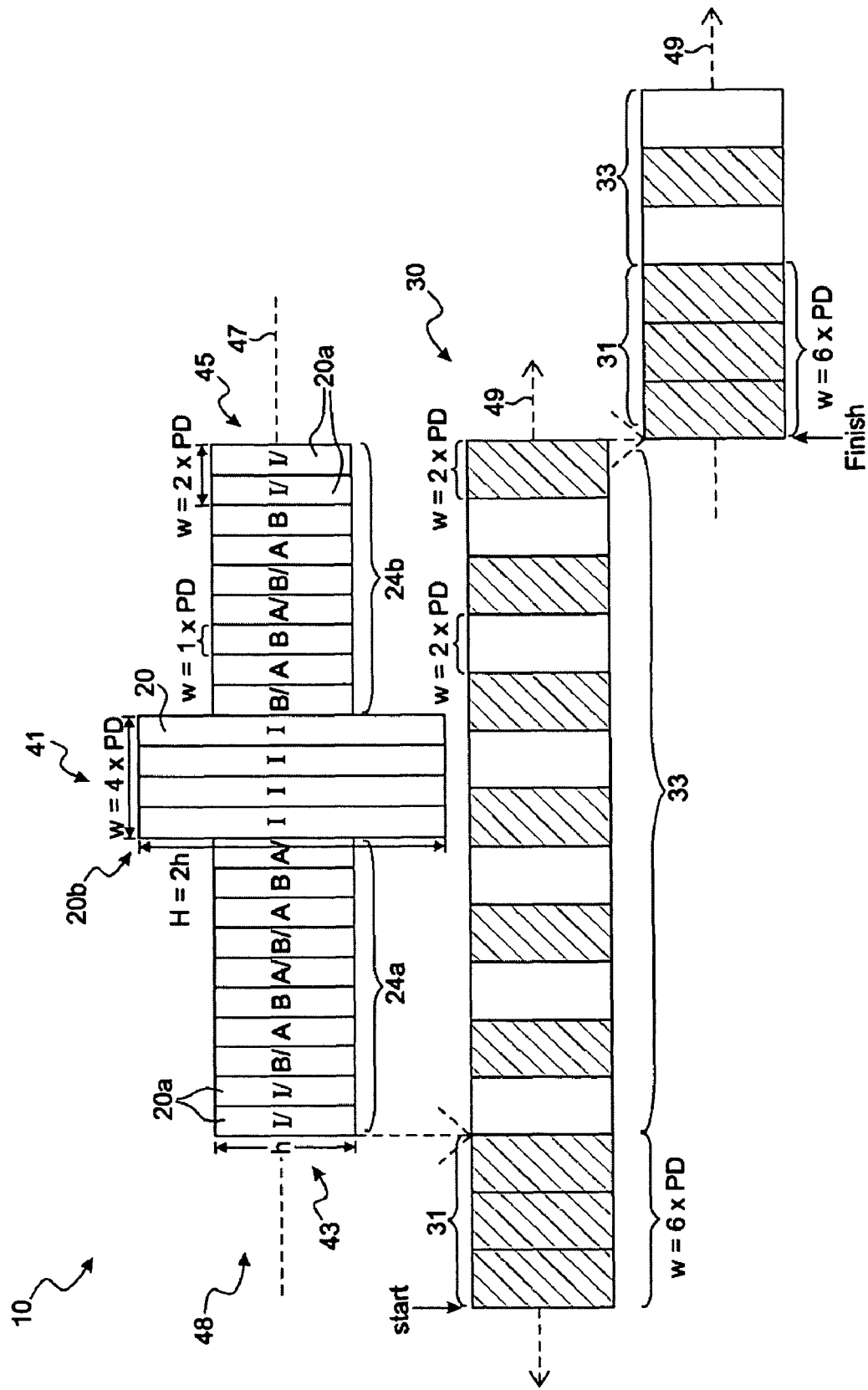
FIG. 5 shows a third embodiment of a reflective optical encoder 10 of the invention.
Figure 7:
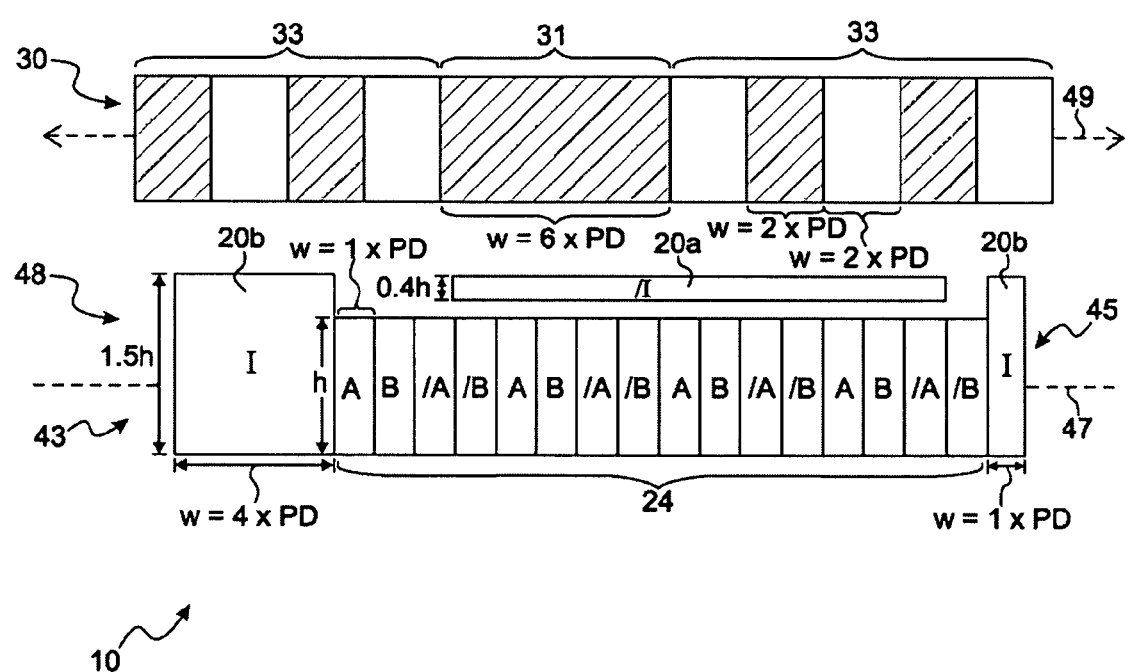
FIG. 7 shows a fourth embodiment of a reflective optical encoder 10 of the invention.

As further shown in the embodiment of FIG. 1, each of the data channel light detectors A, A/, B and B/ (24) has a first width equal to about "PD" (or "photodetector"), while index channel I light detector 20b has a second width equal to about 4 times PD, and index channel I/ light detector 20a has a third width equal to about 3 times PD. Other widths of index channel light detectors I (20b) and I/ (20a) may also be employed, as shown in FIGS. 3, 5 and 7. Widths for index channel light detectors I (20b) and I/ (20a) are preferably selected so that the combination of the width of index scale 31 on code scale 30 and the widths of index channel light detectors I (20b) and I/ (20a) produce an output pulse 26 having a 360 degree width respecting output signals 22 and 24 provided by data channel light detectors A, A/, B and B/ 25 (see FIG. 2). In the example of FIGS. 1 and 2, index scale 31 has a width equivalent to 6 times PD, while each pair of reflective (or light) and non-reflective (or dark) data strips 33 has a combined width equivalent to 4 times PD. Accordingly, the ratio of the two widths (i.e., the width of index strip 31/combined width of the pair light and dark of data strips 33) shown in FIG. 1 is 1.5. Other ratios of the widths of the index and data strips are also contemplated, such as about 2.5 (or about 10 times PD/4 times PD), about 3.5 (or about 14 times PD/4 times PD), and about 4.5 (or about 18 times PD/4 times PD).

Moreover, and as further shown in the embodiment of FIG. 1, the heights H of the index channel light detectors I (20b) and I/ (20b) can differ from the height h of the individual data channel light detectors A, A/, B, and B/. In the embodiment of FIG. 1, data channel light detectors 24 have a first height h, while index channel I light detector 20b has a second height equal to about 1.5 times h, and index channel I/ light detector 20a has a third height equal to about 0.9 times h. Other heights of index channel light detectors I and I/ may also be employed, as shown in FIGS. 3, 5 and 7. Examples of other heights of index channel light detectors I (20a) and I/ (20b) include having heights about 2 times greater than the heights of the individual data channel light detectors 24, about 3 times greater than the heights of the individual data channel light detectors, and about 4 times greater than the heights of the individual data channel light detectors.

In the various embodiments of reflective optical encoder 10, the height H of one or more of index channel light detector I (20a) and index channel light detector I/ (20b) can be increased in respect of the corresponding heights of the data channel light detectors 24 so as to provide sufficient voltage output from Channel I comparator 25 corresponding to index channel light detectors I (20a) and I/ (20b) without the need to provide additional electronic circuitry to boost the current provided by the I and I/ light detectors Those skilled in the art will now understand that a virtually infinite number of suitable permutations and combinations of index channel light detector, data channel light detector, and code wheel index and data strip widths and heights may be employed according to the teachings disclosed herein.

It has been discovered that in a reflective optical single track encoder, line per inch ("LPI") resolutions exceeding about 100 LPI, exceeding about 200 LPI, exceeding about 250 LPI, and/or exceeding about 300 LPI cannot be obtained reliably unless the height of at least one of the index channel light detector I (20b) and the index channel light detector I/ (20a) is at least about 1.5 times higher than the height of corresponding data channel light detectors 24.

Note that as employed herein, the term "resolution" means the fundamental resolution achieved by optical encoder 10 before any interpolation is subsequently performed on the output signals 22, 24 and 26 provided by encoder 10 using, for example, a digital signal processor ("DSP"), a processor, a microprocessor, a CPU, an application specific integrated circuit ("ASIC"), an integrated circuit ("IC") or any other suitable signal processing or computational electronic circuitry. Such interpolation techniques can extend further the fundamental or basic resolution provided by encoder 10. As further shown in the embodiment of FIG. 1, each of the A and A/ data channels, B and B/ data channels, and I and I/ index channels is operably connected to and provides A and A/, B and B/, and I and I/ pairs of analog signals to channel A comparator 21, channel B comparator 23, and channel I comparator 25, respectively. Comparators 21, 23 and 25 compare the respective pairs of analog signals provided thereto by single channel light detector 48, and provide digital output signals 22, 24 and 26 therefrom, as shown in FIG. 2.

Referring now to FIG. 2, it will be seen that Channel A comparator 21 provides digital output signal 22 by comparing the analog signals delivered by data channels A and A/. Output signal 22 is a train of output pulses corresponding to the detection of light reflected from data strips 33 on code scale 30 as code scale 30 moves over single track light detector 48, and light emitted by the light emitter is sequentially reflected onto the channel A and A/ light detectors disposed along common axis 47. Similarly, Channel B comparator 23 provides digital output signal 24 by comparing the analog signals delivered by data channels B and B/. Output signal 24 is a train of output pulses corresponding to the detection of light reflected from data strips 33 on code scale 30 as code scale 30 moves over single track light detector 48, and light emitted by the light emitter is sequentially reflected onto the channel B and B/ light detectors disposed along common axis 47. As shown in FIG. 2, output signals 22 and 24 are out of phase by about 90 degrees with respect to one another. Channel I comparator 25 provides digital output signal 26 by comparing the analog signals delivered by index channels I and I/. Output signal 26 is an index output pulse of substantially greater width than the data output pulses 22 and 24 provided by Channel A and B comparators 21 and 23, and in one embodiment has a width approximating 360 degrees in respect of the widths of data output pulses 22 and 24.

Index strip 31 of FIG. 1 features six strips of opaque areas placed side by side on top of the alternating bar and window areas corresponding to data strips 33. When the code scale 30 moves relative to single track light detector 48, analog signals are generated by index channel I light detector 20b and index channel I/ light detector 20a. Index channel I light detector 20b otherwise produces a high level signal. A low level signal is produced when the six opaque areas of index strip 33 are aligned with the photodiodes of index channel I light detector 20b.

Referring to FIG. 2, digital output signal 26 of Channel I is produced through signal processing when both the analog photodiode I signal 27 and the analog photodiode I/ signal 29 cross over one another. The same principle applies to the digital index channel output signals 26 shown in FIGS. 4, 6 and 8.

Note that the light emitter, single track light detector 48, and code scale 30 of the embodiment of FIG. 1 may together be configured to permit encoder 20 to provide a resolution exceeding about 100 lines per inch (LPI), about 150 LPI, about 200 LPI, or about 300 LPI.

In various embodiments, reflective optical encoder 10 may comprise a single dome lens comprising an optically transparent material, and may also comprise an optically opaque light barrier disposed between the light emitter and single track light detector 38, the light barrier being configured to prevent or inhibit stray light rays from impinging upon single track light detector 38. The data channel light detectors 24 and the index channel light detectors 20a and 20b may also be disposed upon a single integrated circuit die. The substrate upon which the light emitter and single track light detector 48 are disposed may be a printed circuit board, a lead frame, comprise plastic, be formed from a polymer, or comprise any other suitable composition or material.

Referring now to FIG. 3, there is shown another embodiment of reflective optical encoder 10, where single track light detector 48 is mounted on or otherwise attached to a top surface of a substrate (not shown in FIG. 3). A light emitter (also not shown) is also mounted on or attached to the top surface and configured to emit light therefrom in a manner. Single track light detector 48 has a common axis 47. Disposed along the common axis 47 are a plurality of alternating sequences of pairs of A and B data channel light detectors and A/ and B/ data channel light detectors 24, and two index channel I/ light detectors 20a and one index channel I light detector 20a, which according to the embodiment of FIG. 3 are disposed at opposite ends 43 and 45 of single channel light detector 48. The respective pairs of A and A/, and B and B/ data channel light detectors 24 are arranged 90 degrees out of phase with one another. A code scale 30 comprises index and data strips 31 and 33, which depending on the particular application at hand are configured to travel along axis 49 in forward and/or backward directions. Axis 49 of code scale is at least roughly coincident and parallel with corresponding axis 45 of single track light detector 47. Code scale 30 is located and configured operably in respect of single track light detector 48 such that at least a portion of the light emitted from the light emitter is reflected from code scale 30 back towards data and index channel light detectors 24, 20a and 20b.

As further shown in the embodiment of FIG. 3, each of the data channel light detectors A, A/, B and B/ (24) has a first width equal to about "PD" (or "photodetector"), while index channel I light detectors 20b each have a first width equal to about PD, and index channel I/ light detector 20a has a second width equal to about 4 times PD.

As further shown in the embodiment of FIG. 3, the heights H of the index channel light detectors I (20b) and I/ (20b) differ from the heights h of the individual data channel light detectors A, A/, B, and B/. In the embodiment of FIG. 3, data channel light detectors 24 have a first height h, while index channel I light detector 20a and index channel I/ light detector 20b have a second height equal to about 1.5 times h. Note that in the embodiment shown in FIG. 3, index channel I/ light detector comprises two discrete photodetectors 20a, each such photodetector having a width PD and separated by a distance PD. In the embodiment shown in FIG. 3, the width of index strip 31 is 6 times PD, while the width of the data strips is 2 times PD.

As further shown in the embodiment of FIG. 3, each of the A and A/ data channels, B and B/ data channels, and I and I/ index channels is operably connected to and provides A and A/, B and B/, and I and I/ pairs of analog signals to channel A comparator 21, channel B comparator 23, and channel I comparator 25, respectively. Comparators 21, 23 and 25 compare the respective pairs of analog signals provided thereto by single channel light detector 48, and provide digital output signals 22, 24 and 26 therefrom, as shown in FIG. 4.

Figure 4:
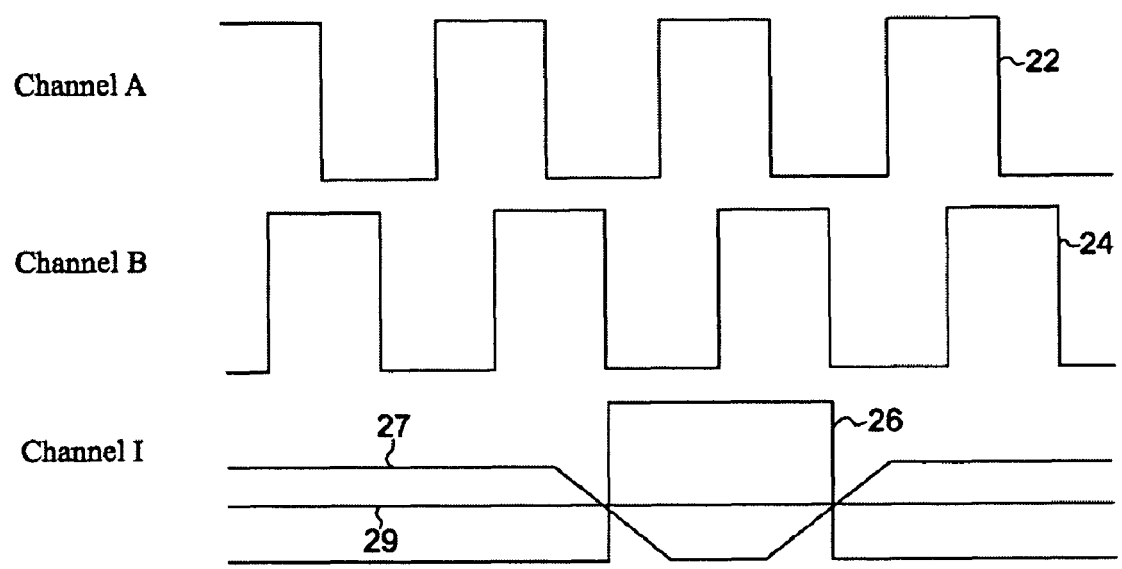
FIG. 4 shows illustrative output signals provided by the embodiment of FIG. 3.

Referring now to FIG. 4, it will be seen that Channel A comparator 21 provides digital output signal 22 by comparing the analog signals delivered by data channels A and A/. Output signal 22 is a train of output pulses corresponding to the detection of light reflected from data strips 33 on code scale 30 as code scale 30 moves over single track light detector 48, and light emitted by the light emitter is sequentially reflected onto the channel A and A/ light detectors disposed along common axis 47. Similarly, Channel B comparator 23 provides digital output signal 24 by comparing the analog signals delivered by data channels B and B/. Output signal 24 is a train of output pulses corresponding to the detection of light reflected from data strips 33 on code scale 30 as code scale 30 moves over single track light detector 48, and light emitted by the light emitter is sequentially reflected onto the channel B and B/ light detectors disposed along common axis 47. As shown in FIG. 4, output signals 22 and 24 are out of phase by about 90 degrees with respect to one another. Channel I comparator 25 provides digital output signal 26 by comparing the analog signals delivered by index channels I and I/. Output signal 26 is an index output pulse of substantially greater width than the data output pulses 22 and 24 provided by Channel A and B comparators 21 and 23, and has a width approximating 360 degrees in respect of the widths of data output pulses 22 and 24.

Note that the light emitter, single track light detector 48, and code scale 30 of the embodiment of FIG. 3 may together be configured to permit encoder 20 to provide a resolution exceeding about 100 lines per inch (LPI), a resolution exceeding about 150 LPI, exceeding about 200 LPI, exceeding about 250 LPI, or exceeding about 300 LPI.

Referring now to FIG. 5, there is shown yet another embodiment of reflective optical encoder 10, where single track light detector 48 is mounted on or otherwise attached to a top surface of a substrate (not shown in FIG. 5). A light emitter (also not shown) is also mounted on or attached to the top surface and configured to emit light therefrom in a manner. Single track light detector 48 has a common axis 47. Disposed along the common axis 47 are a plurality of alternating sequences of pairs of A and B data channel light detectors and A/ and B/ data channel light detectors 24, four index channel I light detectors 20a disposed in the middle 41 of single track light detector 48, and two index channel I/ light detectors 20a, which according to the embodiment of FIG. 5, are each disposed at opposite ends 43 and 45 of single track light detector 48. The respective pairs of A and A/, and B and B/, data channel light detectors 24 are arranged 90 degrees out of phase with one another. A code scale 30 comprises index and data strips 31 and 33, which depending on the particular application at hand are configured to travel along axis 49 in forward and/or backward directions. Axis 49 of code scale 30 is at least roughly coincident and parallel with corresponding axis 45 of single track light detector 47. Code scale 30 is located and configured operably in respect of single track light detector 48 such that at least a portion of the light emitted from the light emitter is reflected from code scale 30 back towards data and index channel light detectors 24, 20a and 20b.

As further shown in the embodiment of FIG. 5, each of the data channel light detectors A, A/, B and B/ (24) has a first width equal to about PD, while index channel I light detector 20b has a width equal to about 4 times PD, and each of index channel I/ light detectors 20a has a width equal to about 2 times PD.

As further shown in the embodiment of FIG. 5, the heights H of the index channel light detectors I (20b) differ from the heights h of the individual data channel light detectors A, A/, B, and B/, and form the height of index channel I/ light detectors 20a. In the embodiment of FIG. 5, data channel light detectors 24 and index channel I/ light detectors 20b have a first height h, while index channel I light detectors 20a have a second height equal to about 2 times h. Note that in the embodiment shown in FIG. 5, the index channel I/ light detector comprises two discrete photodetectors 20a, each such photodetector having a width PD, while the index channel I light detector comprises four discrete photodetectors 20b, each such photodetector having a width PD. In the embodiment shown in FIG. 5, the width of index strip 31 is 6 times PD, while the width of the data strips is 2 times PD.

In a manner similar to that illustrated in FIGS. 1 and 3, each of the A and A/ data channels, B and B/ data channels, and I and I/ index channels of FIG. 5 is operably connected to and provides A and A/, B and B/, and I and I/ pairs of analog signals to a channel A comparator 21, a channel B comparator 23, and a channel I comparator 25, respectively. Comparators 21, 23 and 25 compare the respective pairs of analog signals provided thereto by single channel light detector 48, and provide digital output signals 22, 24 and 26 therefrom, as shown in FIG. 6.

Figure 6:
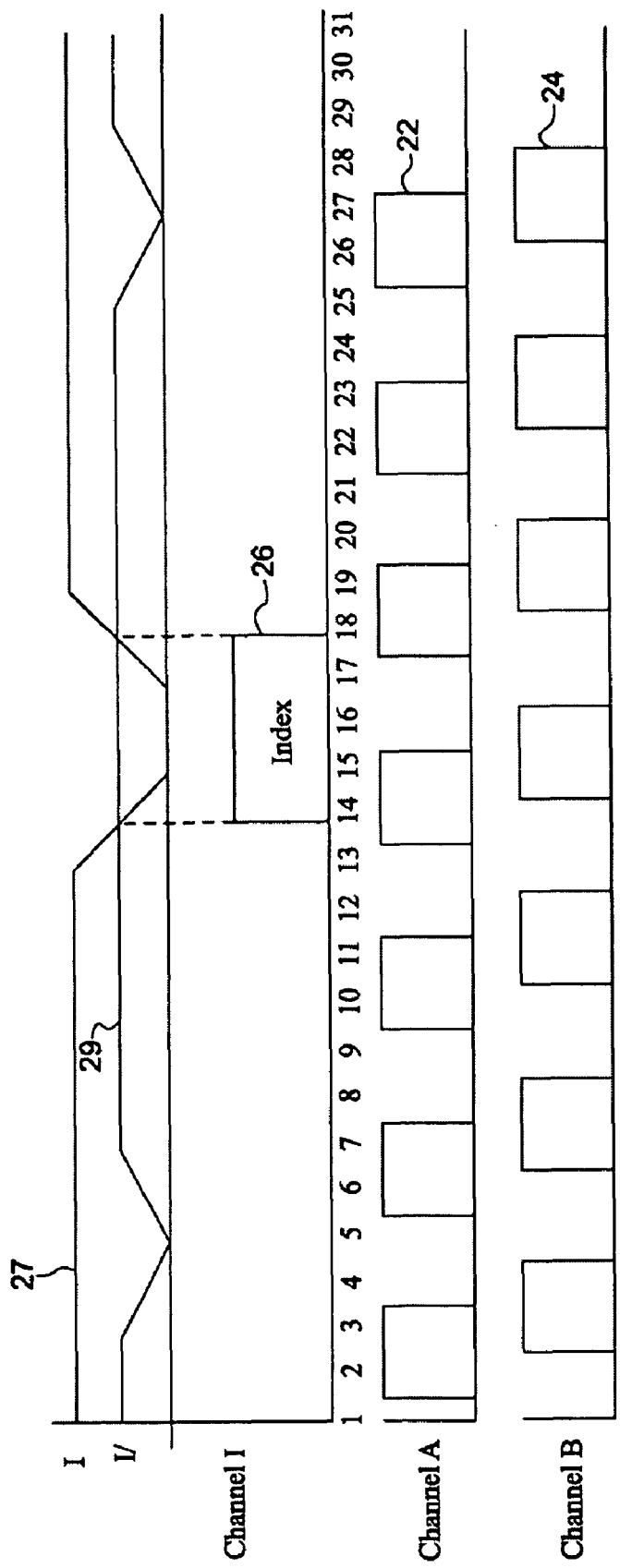
FIG. 6 shows illustrative output signals provided by the embodiment of FIG. 5.

Referring now to FIG. 6, it will be seen that Channel A comparator 21 provides digital output signal 22 by comparing the analog signals delivered by data channels A and A/. Output signal 22 is a train of output pulses corresponding to the detection of light reflected from data strips 33 on code scale 30 as code scale 30 moves over single track light detector 48, and light emitted by the light emitter is sequentially reflected onto the channel A and A/ light detectors disposed along common axis 47. Similarly, Channel B comparator 23 provides digital output signal 24 by comparing the analog signals delivered by data channels B and B/. Output signal 24 is a train of output pulses corresponding to the detection of light reflected from data strips 33 on code scale 30 as code scale 30 moves over single track light detector 48, and light emitted by the light emitter is sequentially reflected onto the channel B and B/ light detectors disposed along common axis 47. As shown in FIG. 6, output signals 22 and 24 are out of phase by about 90 degrees with respect to one another. Channel I comparator 25 provides digital output signal 26 by comparing the analog signals delivered by index channels I and I/. Output signal 26 is an index output pulse of substantially greater width than the data output pulses 22 and 24 provided by Channel A and B comparators 21 and 23, and has a width approximating 360 degrees in respect of the widths of data output pulses 22 and 24.

Note that the light emitter, single track light detector 48, and code scale 30 of the embodiment of FIG. 5 may together be configured to permit encoder 20 to provide a resolution exceeding about 100 lines per inch (LPI), exceeding about 150 LPI, exceeding about 200 LPI, exceeding about 250 LPI, and/or exceeding about 300 LPI.

Referring now to FIG. 7, there is shown still another embodiment of reflective optical encoder 10, where single track light detector 48 is mounted on or otherwise attached to a top surface of a substrate (not shown in FIG. 7). A light emitter (also not shown) is also mounted on or attached to the top surface and configured to emit light therefrom in a manner. Single track light detector 48 has a common axis 47. Disposed along the common axis 47 are a plurality of alternating sequences of pairs of A and B data channel light detectors and A/ and B/ data channel light detectors 24, two index channel I light detectors 20b disposed at opposite ends 43 and 45 of single track light detector 48, and a single index channel I/ light detectors 20a having a major axis disposed along a direction parallel to common axis 47, but offset laterally from the data channel light detectors 24 and not along common axis 47. The respective pairs of A and A/, and B and B/ data channel light detectors 24, are arranged 90 degrees out of phase with one another. A code scale 30 comprises index and data strips 31 and 33, which depending on the particular application at hand are configured to travel along axis 49 in forward and/or backward directions. Axis 49 of code scale 30 is at least roughly coincident and parallel with corresponding axis 45 of single track light detector 47. Code scale 30 is located and configured operably in respect of single track light detector 48 such that at least a portion of the light emitted from the light emitter is reflected from code scale 30 back towards data and index channel light detectors 24, 20a and 20b.

As further shown in the embodiment of FIG. 7, each of the data channel light detectors A, A/, B and B/ (24) has a first width equal to about PD, while index channel I light detector 20b has a width equal to about 4 times PD. The width of index channel I/ light detector 20a is equal to about 1 times PD.

As further shown in the embodiment of FIG. 7, the height H of index channel light detector I (20b) differs from the heights h of the individual data channel light detectors A, A/, B, and B/. As shown in FIG. 7, height H of index channel I light detector 20b is equal to about 1.5 times h, while index channel I/ light detector 20a has a height equal to about 0.4 times h. Note that in the embodiment shown in FIG. 7, the index channel I/ light detector comprises one discrete photodetector 20a, while the index channel I light detector 20b comprises two discrete photodetectors 20b, each such photodetector having a width of about 4 times PD and about 1 times PD, respectively. In the embodiment shown in FIG. 7, the width of index strip 31 is about 6 times PD, while the width of the data strips is about 2 times PD.

In a manner similar to that illustrated in FIGS. 1 and 3, each of the A and A/ data channels, B and B/ data channels, and I and I/ index channels of FIG. 7 is operably connected to and provides A and A/, B and B/, and I and I/ pairs of analog signals to a channel A comparator 21, a channel B comparator 23, and a channel I comparator 25, respectively. Comparators 21, 23 and 25 compare the respective pairs of analog signals provided thereto by single channel light detector 48, and provide digital output signals 22, 24 and 26 therefrom, as shown in FIG. 8.

Figure 8:
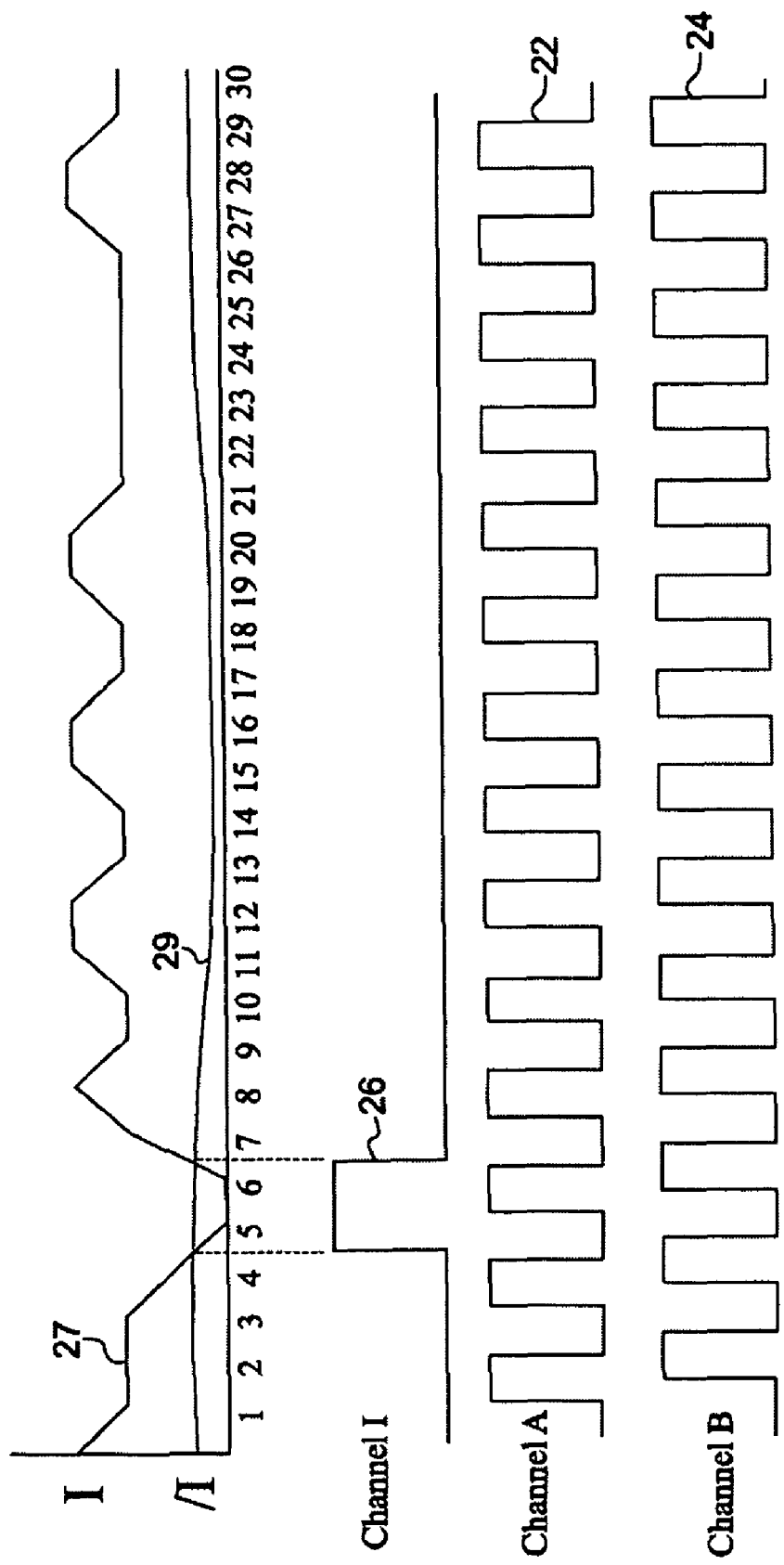
FIG. 8 shows illustrative output signals provided by the embodiment of FIG. 7.

Referring now to FIG. 8, it will be seen that Channel A comparator 21 provides digital output signal 22 by comparing the analog signals delivered by data channels A and A/. Output signal 22 is a train of output pulses corresponding to the detection of light reflected from data strips 33 on code scale 30 as code scale 30 moves over single track light detector 48, and light emitted by the light emitter is sequentially reflected onto the channel A and A/ light detectors disposed along common axis 47. Similarly, Channel B comparator 23 provides digital output signal 24 by comparing the analog signals delivered by data channels B and B/. Output signal 24 is a train of output pulses corresponding to the detection of light reflected from data strips 33 on code scale 30 as code scale 30 moves over single track light detector 48, and light emitted by the light emitter is sequentially reflected onto the channel B and B/ light detectors disposed along common axis 47. As shown in FIG. 8, output signals 22 and 24 are out of phase by about 90 degrees with respect to one another. Channel I comparator 25 provides digital output signal 26 by comparing the analog signals delivered by index channels I and I/. Output signal 26 is an index output pulse of substantially greater width than the data output pulses provided by Channel A and B comparators 21 and 23, and has a width approximating 360 degrees in respect of the widths of data output pulses 22 and 24.

Note that the light emitter, single track light detector 48, and code scale 30 of the embodiment of FIG. 7 may together be configured to permit encoder 20 to provide a resolution exceeding about 100 lines per inch (LPI), exceeding about 150 LPI, exceeding about 200 LPI, exceeding about 250 LPI, and/or exceeding about 300 LPI.

The various embodiments of the invention solve certain problems and have certain advantages. In some embodiments, single track light detector 48 permits the size and cost of an encoder to be reduced, seeing as two data channels and one index channel can be disposed along a single track, and the photodetector arrays corresponding to the three channels can be disposed on a single integrated circuit die. Typically, an integrated circuit in a reflective optical encoder is the single most expensive component in a reflective optical encoder. The small footprints and sizes permitted by the single track configuration disclosed herein permit small encoders with high resolution to be constructed. Moreover, the area over which light is spread by the emitter and the code scale can be made smaller since the surface areas of the data channel and index channel light detectors can be reduced using the single track light detector disclosed herein. Sensitivity to radial misalignments between the code scale and the light detector is reduced because only one detector track is employed. As a result, misalignments between the code wheel and the light detector are reduced, and manufacturing and assembly costs are reduced because no special equipment is required to align the code scale with the light detector. Some embodiments eliminate complicated electronic circuitry required in the prior art since no additional circuitry must be used to boost current outputs, or to perform complicated logic operations to generate the index channel output signal. Various embodiments of the optical reflective encoder also permit much higher resolutions to be achieved than possible heretofore, notwithstanding the smaller size and footprint of the encoder. The various embodiments are relatively simple and easy to implement, permit the use of smaller light emitting zones than has heretofore been possible, resulting in smaller packages, reduce the sensitivity of the code wheel and the light detector photodiode arrays to misalignment, reduce die and assembly cost, use conventional and simple electronic circuitry, and eliminate the need for circuit redesign. In addition, in some embodiments different index pulse widths can be generated according to the particular application at hand since the index channels I and I/ do not share photodiodes with data channels A, A/, B and B/.

Included within the scope of the present invention are methods of making and having made the various components, devices and systems described herein. By way of example, methods of making a reflective optical encoder are provided, which comprise providing a substrate having a top surface; mounting on or attaching a light emitter to the top surface; mounting on or attaching a single track light detector to the top surface, the single track light detector having a common axis and a direction of travel associated therewith, the single track light detector having disposed along the common axis a plurality of alternating sequences of pairs of A and B data channel light detectors and A/ and B/ data channel light detectors, and at least one pair of index channel I and I/ light detectors, wherein A and A/, B and B/, and I and I/ light detectors are arranged 90 degrees out of phase with one another, and locating and operably disposing a code scale in respect of the single track light detector, the code scale comprising index and data strips, such that the code scale travels along the common axis and at least a portion of the light emitted from the light emitter is reflected from the code scale towards the data and index channel light detectors. Such methods may further comprise providing each of the data channel light detectors with a first width, and at least one of the index channel I light detector and the index channel I/ light detector with a second width about 1.5, 2, 3 or 4 times greater than or equal to the first width.

Various embodiments of the invention are contemplated in addition to those disclosed hereinabove. For example, transmissive optical encoders incorporating the single track and other features of the embodiments described hereinabove are specifically contemplated.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A reflective optical encoder, comprising:
a substrate having a top surface;
a light emitter mounted on or attached to the top surface and configured to emit light therefrom;
a single track light detector mounted on or attached to the top surface, the single track light detector having a common axis, the single track light detector having disposed along the common axis a plurality of alternating sequences of pairs of A and B data channel light detectors and A/ and B/ data channel light detectors, and at least one pair of index channel I and I/ light detectors, wherein the A and A/ light detectors, and the B and B/ light detectors, are arranged 90 degrees out of phase with one another, and
a code scale comprising index and data strips and configured to travel along the common axis, the code scale being located and configured operably in respect of the single track light detector such that at least a portion of the light emitted from the light emitter is reflected from the code scale towards the data and index channel light detectors;
wherein each of the data channel light detectors has a first width and a first height, at least one of the index channel I light detector and the index channel I/ light detector has a second width greater than about 1.5 times, greater than about 2 times, or greater than about 3 times the first width, and at least one of the index channel I light detector and the index channel I/ light detector has a second height greater than the first height.

2. The reflective optical encoder of claim 1, wherein the second height is greater than about 1.5 times the first height.

3. The reflective optical encoder of claim 1, wherein the second height is greater than about 2 times the first height.

4. The reflective optical encoder of claim 1, wherein the second height is greater than about 3 times the first height.

5. The reflective optical encoder of claim 1, wherein one of the index channel I and the index channel I/ has a third height less than or equal to the first height and the second height.

6. The reflective optical encoder of claim 5, wherein the third height is about 0.9 times the first height.

7. The reflective optical encoder of claim 1, wherein the pairs of reflective and non-reflective data strips on the code scale have a combined first code pair width, and the index strips on the code scale have a second index code width, and the second index code width is at least about 1.5 times the first code pair width.

8. The reflective optical encoder of claim 1, wherein the pairs of reflective and non-reflective data strips on the code scale have a combined first code pair width, the index strips on the code scale have a second index code width, and the second index code width is at least about 2.5 times the first code pair width.

9. The reflective optical encoder of claim 1, wherein the pairs of reflective and non-reflective data strips on the code scale have a combined first code pair width, the index strips on the code scale have a second index code width, and the second index code width is at least about 3.5 times the first code pair width.

10. The reflective optical encoder of claim 1, wherein at least one of the index channel I light detector and the index channel I/ light detector comprises at least two discrete light detectors.

11. A reflective optical encoder, comprising:
a substrate having a top surface;
a light emitter mounted on or attached to the top surface and configured to emit light therefrom;
a single track light detector mounted on or attached to the top surface, the single track light detector having a common axis, the single track light detector having disposed along the common axis a plurality of alternating sequences of pairs of A and B data channel light detectors and A/ and B/ data channel light detectors, and at least one pair of index channel I and I/ light detectors, wherein the A and A/ light detectors, and the B and B/ light detectors, are arranged 90 degrees out of phase with one another, and
a code scale comprising index and data strips and configured to travel along the common axis, the code scale being located and configured operably in respect of the single track light detector such that at least a portion of the light emitted from the light emitter is reflected from the code scale towards the data and index channel light detectors;
wherein each of data channel light detectors has a first width, and at least one of the index I channel light detector and the index channel I/ light detector has a second width about 1.5 times greater than the first width, and the at least two discrete light detectors are separated by a distance of about the first width.

12. The reflective optical encoder of claim 11, wherein at least one of the index channel I light detector and the index channel I/ light detector comprises at least four adjoining discrete light detectors, each such discrete light detector having the first width.

13. The reflective optical encoder of claim 11, wherein the at least four adjoining discrete light detectors are located in the middle of the single track light detector.

14. The reflective optical encoder of claim 12, wherein the index I channel light detector comprises the at least four adjoining discrete light detectors, and the index channel I/ light detector comprises at least first and second pairs of two adjoining discrete light detectors, each such discrete light detector having the first width, the first and second pairs being located at first and second ends of the single track light detector, respectively.

15. The reflective optical encoder of claim 11, wherein each of the A and A/ data channels, B and B/ data channels, and I and I/ index channels is operably connected to and provides A and A/, B and B/, and I and I/ pairs of analog signals to channel A, channel B, and channel I comparators, respectively.

16. The reflective optical encoder of claim 15, wherein each of the channel A, channel B, and channel I comparators is configured to provide digital high and low output signals therefrom based upon comparisons between the pairs of A and A/, B and B/, and I and I/ analog signals delivered respectively thereto.

17. The reflective optical encoder of claim 11, wherein the light emitter, the single track light detector, and the code scale are together configured to permit the encoder to provide a resolution exceeding about 100 lines per inch (LPI), about 100 lines per inch (LPI), about 200 lines per inch (LPI), about 250 lines per inch (LPI), about 300 lines per inch (LPI), or about 400 lines per inch (LPI).

18. The reflective optical encoder of claim 11, further comprising a single dome lens comprising an optically transparent material.

19. The reflective optical encoder of claim 11, further comprising an optically opaque light barrier disposed between the light emitter and the single track light detector, the light barrier being configured to prevent or inhibit stray light rays from impinging upon the single track light detector.

20. The reflective optical encoder of claim 11, wherein the data channel light detectors and the index channel light detectors are disposed upon a single die.

21. The reflective optical encoder of claim 11, wherein the substrate is a printed circuit board, a lead frame, comprises plastic or is formed from a polymer.

22. A method of making a reflective optical encoder, comprising:
providing a substrate having a top surface;
mounting on or attaching a light emitter to the top surface;
mounting on or attaching a single track light detector to the top surface, the single track light detector having a common axis associated therewith, the single track light detector having disposed along the common axis a plurality of alternating sequences of pairs of A and B data channel light detectors and A/ and B/ data channel light detectors, and at least one pair of index channel I and I/ light detectors, wherein each of the data channel light detectors has a first height and a first width, and at least one of the index channel I light detector and the index channel I/ light detector has a second height, the second height being greater than the first height, at least one of the index channel I light detector and the index channel I/ light detector has a second width greater than about 1.5 times, greater than about 2 times, or greater than about 3 times than the first width, and the A and A/ light detectors, and the B and B/ light detectors, are arranged 90 degrees out of phase with one another, and
locating and operably disposing a code scale in respect of the single track light detector, the code scale comprising index and data strips, such that the code scale travels along the common axis and at least a portion of the light emitted from the light emitter is reflected from the code scale towards the data and index channel light detectors.

23. The method of claim 22 wherein the second height provided is about 1.5 times greater than, or about 2 times greater than the first height.

24. The method of claim 22, further comprising providing the code scale with alternating pairs of light and dark reflective and non-reflective data strips, the pairs of data strips having a first width, and at least one code strip having a second width, the ratio between the second and first widths being one of about 1.5, about 2.5, and about 3.5.

* * * * *